United States Patent
Fischmann

(10) Patent No.: US 12,498,845 B2
(45) Date of Patent: *Dec. 16, 2025

(54) METHOD AND APPLICATION FOR FAST SHARING OF IMAGES BETWEEN MOBILE ELECTRONIC DEVICES USING AN INNOVATIVE PLATFORM AND ARTIFICIAL INTELLIGENCE

(71) Applicant: YAE, LLC, Miami, FL (US)

(72) Inventor: Fernando Fischmann, Miami, FL (US)

(73) Assignee: YAE, LLC, Miami, FL (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/472,814

(22) Filed: Sep. 22, 2023

(65) Prior Publication Data

US 2024/0419306 A1    Dec. 19, 2024

Related U.S. Application Data

(60) Provisional application No. 63/508,791, filed on Jun. 16, 2023.

(51) Int. Cl.
*G06F 3/048*    (2013.01)
*G06F 3/0484*    (2022.01)
(Continued)

(52) U.S. Cl.
CPC .......... *G06F 3/0484* (2013.01); *G06F 3/0488* (2013.01); *G06V 20/30* (2022.01); *H04M 1/72439* (2021.01); *H04N 23/632* (2023.01)

(58) Field of Classification Search
CPC ................ G06F 3/0484; G06F 3/0488; G06F 16/24578; G06F 3/04886; G06F 1/1677;
(Continued)

(56) References Cited

U.S. PATENT DOCUMENTS 9,456,086 B1    9/2016  Wu et al.
9,459,792 B2 *  10/2016 Matas ............... G06F 1/1686
(Continued)

FOREIGN PATENT DOCUMENTS

CA    2 834 522 A1    5/2014
CA    3 074 961 A1    9/2020
(Continued)

OTHER PUBLICATIONS

International Search Report and Written Opinion for Application No. PCT/US2023/085780 mailed Jun. 18, 2024.

*Primary Examiner* — Linh K Pham
(74) *Attorney, Agent, or Firm* — Merchant & Gould P.C.

(57) ABSTRACT

A method for quickly sharing images between mobile electronic devices using a platform and artificial intelligence. Such devices include a touch sensitive display and a processor. The method preferably includes capturing media content, such as an image, with a user gesture or action; processing the captured image using an artificial intelligence system based on the user's prior communications and patterns; presenting a screen on the display having a plurality of selectable regions, each selectable region associated with a different communication channel/audience, the plurality of channel/audience combinations including at least one of: a recipient and an associated channel selected from text, email, or mobile applications or a social media platform of the user; receiving input from a second user gesture or action on a selected region; and upon receipt of the second gesture-action, creating and transmitting a message in accordance with the selected combination, wherein the message includes the shareable content.

22 Claims, 3 Drawing Sheets

(51) Int. Cl.
  *G06F 3/0488* (2022.01)
  *G06V 20/30* (2022.01)
  *H04M 1/72439* (2021.01)
  *H04N 23/63* (2023.01)

(58) Field of Classification Search
  CPC ..... G06F 2203/04803; H04M 1/72439; H04N 23/632; G06Q 50/01
  See application file for complete search history.

(56) References Cited

U.S. PATENT DOCUMENTS

| | | | |
|---|---|---|---|
| 10,346,411 B1* | 7/2019 | Deselaers | G06Q 50/01 |
| 2011/0154188 A1* | 6/2011 | Forstall | H04M 1/72403 |
| | | | 715/236 |
| 2011/0276396 A1 | 11/2011 | Rathod | |
| 2013/0317944 A1 | 11/2013 | Huang et al. | |
| 2014/0129942 A1 | 5/2014 | Rathod | |
| 2019/0019012 A1* | 1/2019 | Huang | G06V 40/161 |
| 2020/0053206 A1 | 2/2020 | Kats et al. | |
| 2021/0342785 A1 | 11/2021 | Mann et al. | |
| 2021/0344795 A1 | 11/2021 | Kats et al. | |
| 2022/0070385 A1* | 3/2022 | Van Os | H04N 23/62 |
| 2022/0374123 A1* | 11/2022 | Zhang | G06F 1/1647 |
| 2023/0367464 A1 | 11/2023 | Ji et al. | |
| 2024/0004521 A1* | 1/2024 | Devine | G06F 3/0485 |
| 2025/0068314 A1* | 2/2025 | Tang | G06F 3/0481 |

FOREIGN PATENT DOCUMENTS

| | | | |
|---|---|---|---|
| CA | 3074961 C * | 9/2021 | ......... H04N 21/4828 |
| CA | 3 222 725 A1 | 12/2022 | |
| CN | 115729392 A | 3/2023 | |
| CN | 117178302 A | 12/2023 | |
| JP | 4759844 B2 | 8/2011 | |
| JP | 2023500656 A * | 1/2023 | ........... G06F 1/1641 |
| KR | 10-2024-0024351 A | 2/2024 | |
| WO | 2013/125796 A1 | 8/2013 | |
| WO | 2014/014695 A1 | 1/2014 | |

* cited by examiner

METHOD AND APPLICATION FOR FAST SHARING OF IMAGES BETWEEN MOBILE ELECTRONIC DEVICES USING AN INNOVATIVE PLATFORM AND ARTIFICIAL INTELLIGENCE

CROSS-REFERENCE TO RELATED APPLICATIONS

This application is a non-provisional of U.S. Provisional Patent Application No. 63/508,791, filed Jun. 16, 2023. The disclosure of the priority application in its entirety is hereby incorporated by reference into the present application.

FIELD OF THE INVENTION

The present disclosure relates to a method and application for capturing, sharing, and uploading images and other media content from mobile electronic devices and between mobile electronic devices using an innovative platform and artificial intelligence. In particular, the present disclosure provides a method, software, e.g., an "application," and/or a device that integrate the functionalities of media content capturing and fast sharing with a reduced set of required user actions, such as down to one touch, using artificial intelligence.

BACKGROUND OF THE INVENTION

With the rapid proliferation of electronic devices such as mobile electronic devices, people use such electronic devices for capturing and sharing images (and other media content), on a daily basis. More and more electronic devices such as mobile phones, media players, Personal Digital Assistants (PDAs) and computers both laptops and desktops are being used to display various media content, including photos, videos and screenshots, among others, as well as other media files, (such as slide shows, artwork, and music files), internet content, documents or other files and other image data.

In 2021, according to data from S. O'Dea, the number of mobile devices operating worldwide stood at almost 15 billion, up from just over 14 billion in the previous year. Further, based on preliminary analysis, the number of mobile devices is expected to reach 18.22 billion by 2025, an increase of 4.2 billion devices compared to 2020 levels. Over the past decade, mobile devices, such as smartphones and tablets have been the primary driver of the increase in photo- and video-taking among the billions of global online users. Between 2010 and 2019, by using smartphones, tablets, digital cameras, and film cameras, the global population took over 8.6 trillion photos—seven times more than was taken in the previous decade. In June 2021, based on data from Rise Above Research, it was estimated that the 2020 global photos figure reached an all-time record of 1.12 trillion, numbers which are expected to continue to rise. FIG. 1 shows a chart with the projection of the number of total photos taken at a global scale, wherein it can be seen that in 2023 users are expected to take up to about 1.61 trillion photos.

As it has become a trend, mobile phones, especially smartphones are the most-used devices, whose share of total photos worldwide is estimated to rise from 89% in 2020 to over 93% in 2023. Smartphones are expected to continue to dominate as the primary photo-taking device, with photo and video becoming a bigger part of the image-capture mix, particularly among younger adults and teens.

In this context, it is important to note that in today's digitized world where information travels faster than ever, people do not use this media content, such as photos and videos only as means to remember events from the past but instead to engage in instant communication. Humans have a remarkable ability to remember images. Studies show that humans can remember more than 2,000 images with at least 90% accuracy in recognition tests over a period of several days, even with short presentation times (Grady, et al). This excellent memory for pictures consistently exceeds human's ability to remember words or pieces of text. Furthermore, cognitive psychology research has shown that images can strengthen communications in several different ways: they can capture attention, evoke emotions, and easily convey a large amount of information and ideas in a relatively short amount of time. In fact, it can take a thousand words just to describe what is in one picture. Images have the ability to convey abstract and complex concepts such as facial expressions or others, which explains the explosive growth of visual content sharing through electronic devices, such as smartphones.

Visual communication is therefore important—among other factors—due to the following:
1. Images are memorable while messages are forgettable. An image increases a message's memorability since the human brain is wired to process images quicker, up to 60,000 faster.
2. Images aid the neurological functions of the human brain and enable emotional learning to occur in shaping attitudes, thinking, and behavior.
3. People look for patterns in their environment to make sense of their surroundings, to help make choices, to understand concepts and to achieve knowledge.
4. Visuals simplify communication and can reach a wider global audience. Images cross language barriers.
5. Images can reflect the uniqueness of a product or service.
6. Images make the invisible visible by creating a visual representation of an intangible service or object.
7. Visual communication has the potential to build a brand's image, identity and equity.

The same is the case for the creation and sharing of media content such as videos. Video growth statistics show that YouTube, Instagram and Facebook tend to be the most popular social platforms for video sharing. In 2020, 96% of consumers increased their online video consumption, and 9 out of 10 viewers said that they wanted to see more videos from brands and businesses. In fact, as of 2022, an average person is predicted to spend 100 minutes per day watching online videos. In the same way as in for photos, data shows that viewers retain 95% of a message when they watch it in a video, compared to 10% when reading it in the text.

Furthermore, current platforms provide users with the possibility of managing their e-mails, browsing the web as well as watching their favorite series and listening to music, all using the same device, which increases the user's need to quickly share said content with their contacts.

People are therefore prompted to continuously share content with others, wherein content includes images, links, documents, among other content, and wherein the media content include photos, videos, and screenshots, among others, and wherein the links include links to images, music, films, series, e-mails, and websites, among others. As described herein, the content that is intended to be shared with a user may also be referred to as shareable content. Sharing media content with friends, family, in business communications, as well as through social media, helps people to easily convey a message without the need to write a lengthy text, which usually requires a longer time and closer attention to the details of the same. Furthermore, sharing an image is perceived by people as a more spontaneous and engaging activity due to their capacity to increase the memorability, as explained above.

A user may often wish to share interesting content with their contacts while communicating through electronic devices. To facilitate content sharing, many current operating systems and applications implement different functionalities to facilitate content sharing. People are sharing more and more information electronically. Users send media content, including images (such as photos), videos, screenshots, among others, to friends, colleagues and loved ones and for many people, smartphones are their main platform for communication and for staying connected and informed. Photos, videos, and sound clips are often posted to social-networking sites. The increasingly rapid reach of electronic communication triggers people, to quickly share photographs or other content with their friends or others.

Despite the improvements in mobile operating systems and applications, the capture and sharing of media is generally not smoothly integrated and many applications are still limited in their capturing and sharing capabilities. In particular, one of the most important current limitations to the communication via images is the number of steps that the user needs to complete when using current smartphones and their operating systems, with the subsequent time and efforts invested. Therefore, users still require a solution to facilitate the way they communicate through media content, such as images, with their contacts.

A common difficulty is that sharing of images and other content may be quite slow or clumsy and requires many steps to be taken by the user, which is often perceived as being problematic for sharing images quickly and easily. For instance, a user typically needs to shoot a photo or video clip using a software application native to a mobile device (e.g., the "camera" application), and then tap into another application software and use its "share" feature which allows the user to access the image or video from a gallery folder. Then the user needs to scroll through a list of messaging applications, then scrolling through a list of contacts to then sending it to their contacts or sharing it to a social media network of choice. The sharing process may also be complex, requiring several selections, and not allowing the sharing of the content "on the spot". For example, if a mother of a young child wants to share photos with several family members and friends, she may have to select, through various interfaces, the photo and further how to share the photo for each of the family members and friends. However, one family member may want photos sent via WhatsApp, another through a social media platform, another through iMessage, and another through text messages. To share the photo to the desired people and in the desired way, the mother selects one family member's WhatsApp number from a contact list, enter another's social media profile name, find another's number linked to the iMessage account and still another's phone number to send the text message. This process, which at a glance may seems easy and straightforward, is usually perceived by users and lengthy. Considering all the different messaging platforms currently existing and the amount of content that users share on a daily basis, it becomes possible, if not likely, that the extent a user might share content will be limited based on the difficulty encountered in that sharing process.

Another setback in current media content sharing is the ability to see how such media content has been used or who has it been shared with, in order to check the "log" related to such content, for example, an image. As an example, a mother wants to share a photo of her newborn with her family and wants to check if she sent the photo to all of her family contacts, for which she has to access each contact's window and application used for sharing such image. Today there are no widely used centralized or fast methods that can show who has received a photo or through which platform has an image been sent, which makes it difficult to create a log related to such content.

As applications and user interfaces evolve, they incorporate more and more functions, and carry therefore more and more application buttons accordingly. Therefore, the functionality and process of implementing content sharing may be increasingly buried within a hierarchy of user option selections at a rather hidden level. This causes the user to have to perform several actions to find. Meanwhile, for example, for each action (such as a tap on the screen) of the user, the device would pop up a toolbar, menu or sharing page correspondingly, and each pop-up takes up a certain time, which results in an overall longer time for sharing content. This may require the user to perform several actions that are not always associated with each other, and being initiated from different menus and which requires an in-depth understanding of the system being used.

Native user interfaces of mobile electronic devices such as iOS and Android in general aim to facilitate these steps as they integrate the sharing functionalities of other third-party applications and social media platforms, however, the sharing menu at native user interfaces, such as the camera application, is also combined with many other functionalities such as editing features, copying, add to shared album, duplicate, hide, slideshow, creating link, assigning to a contact, printing, and creating an album, among others, which increase the time and attention that the user needs to dedicate to complete the sharing action.

The following Table compares the number of steps that need to be taken to share an image with a contact from the camera application on an iOS and Android system.

TABLE 1

Steps to Share an Image with a Contact from a Camera App

| Number of Steps | iOS | Android |
|---|---|---|
| 1 | Open camera application | Open the Photos, Camera or Gallery app |
| 2 | Tapping on camera roll | Tap on the Photo to be shared |
| 3 | Select a photo to be sent | Tap on the Share icon to launch the Share via pop-up menu |
| 4 | Tap on the share button | Scroll through the Share menu with a list of apps |

TABLE 1-continued

Steps to Share an Image with a Contact from a Camera App

| Number of Steps | iOS | Android |
|---|---|---|
| 5 | Scroll through a list of icons of messaging apps | Select a messaging app, for example, the Gmail icon, which will launch a new email window with the selected Photo already attached to the new message |
| 6 | Select a messaging application | Type in the Message, add recipient's email address |
| 7 | Select a contact to share the photo with | Tap on the Send icon |
| 8 | Tap on the next button | |
| 9 | Add a caption (optional) | |
| 10 | Tap on Send | |

Further, if a user is capturing an image and then wishes to share that image, the steps can be seen below:

TABLE 2

Capture an Image and Share

| Number of Steps | iOS | Android |
|---|---|---|
| 1 | Open camera application | |
| 2 | Capture an image | |
| 2 | Select the captured image from the lower section of the camera App | |
| 3 | Tap on the share button | |
| 4 | Scroll through a list of icons of messaging apps | |
| 5 | Select a messaging application | |
| 6 | Select a contact to share the photo with | |
| 7 | Tap on the next button | |
| 8 | Add a caption (optional) | |
| 9 | Tap on Send | |

In addition to this context, it is important to note that artificial intelligence has exponentially advanced over the past years and months, with more and more uses in different contexts and markets. The use of artificial intelligence (AI) has reached the public through open-source software such as ChatGPT and others, which has helped close the gap between the everyday use of AI in daily applications. Further, the integration of AI into applications, software, and tasks has grown exponentially, through the use of machine learning and other methods to help the users advance in a specific task, or understand what a user is intending to achieve and help with such task, or make more efficient searches, selections, or actions, among others.

It is in this general technical context that aspects of the present disclosure are implemented, disruptive improvements on the above being described below, promoting a revolution in image and content communication.

SUMMARY

The present disclosure pertains to a method and application for convenient sharing of media content, such as an image, between mobile electronic devices using a reduced set of user gestures, such as down to one touch, with an innovative platform while using artificial intelligence that is able to suggest suitable recipient alternatives based on the user's past input actions, messaging patterns and content analysis.

The application of the present disclosure allows to share media content having to perform few steps compared to current sharing processes, where the artificial intelligence platform suggests a combination of recipients, communication channels, and/or social media platforms where the user may intend to share the content with, and provides a simple interface that allows to quickly share such content with a very reduced set of actions.

In accordance with the present disclosure, the content that is shared preferably includes media content (such as images, screenshots and videos). As described herein, the content that is shared is referred to as shareable content or shareable media content (a sub-set of the shareable content).

In particular, the present invention relates to an electronic device, and a method performed by said electronic device for fast sharing of media content between mobile electronic devices using artificial intelligence.

DESCRIPTION OF THE INVENTION

Figure 1:
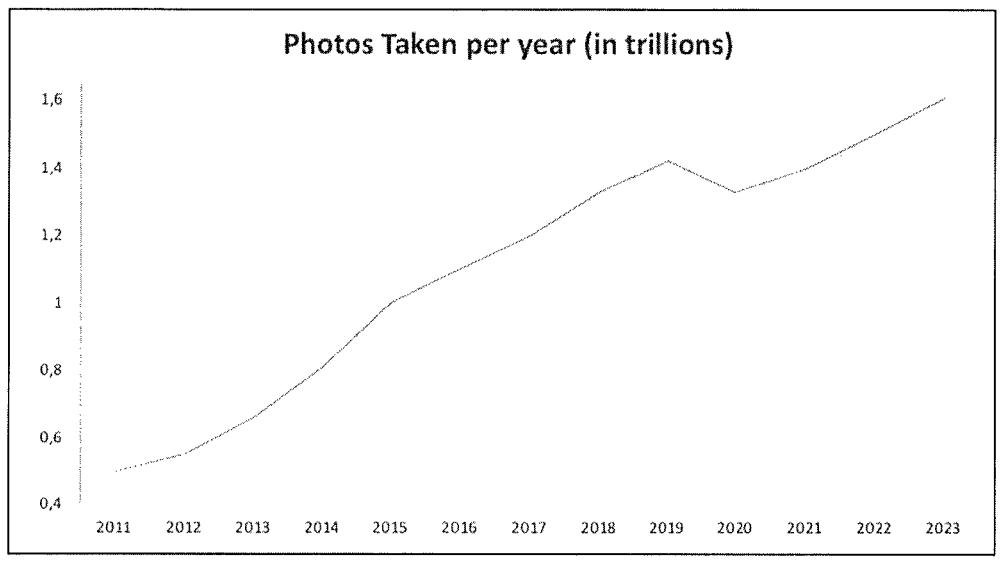
FIG. 1 shows a chart with historic data and a projection of the number of photos to be taken by smartphone users at a global scale.

Based on the above background, it would be a revolution in the communications industry to provide a method, software, e.g., an "application," and/or a device which provide for streamlined, immediate sharing of content through the use of a simple interface and an artificial intelligence platform that suggest suitable combinations of recipients, communication channels, and/or social media platforms with which the user can share such content, based on the user's past input actions, messaging patterns and content analysis, among others.

The method of the invention provides for a fast sending of the shareable content (200), since it provides the user with a plurality of options in a simple interface that organizes and presents suitable sharing options given the analysis of the content to be shared through artificial intelligence. Through the analysis of the content that is intended to be shared, the method presents a plurality of selectable regions (205) that comprise a selection of recipients and their communication channel at the same screen, organized based on the perceived intention of the user as analyzed by the artificial intelligence platform.

The user can therefore be quickly presented with a simple interface having suitable options to select and send the shareable content, all in the same screen, which facilitates and expedites the completion of the sharing process. The user therefore saves significant time since there is no need to open multiple applications to share such content with an intended recipient/social media platform. This contributes, for example, to a substantial shortening of the time needed by a user to send a photo to a contact of about two, or three, or four or up to five times compared to existing operating systems and applications, due to the reduction in user interaction steps that are required given the use of a simple interface and artificial intelligence. The use of artificial intelligence is paramount to the method of the present disclosure, as it analyses the content and identifies, based on the user's prior communications and patterns, the type of photo, the geolocation, etc., the best combination of recipients and communication channels and/or social media platforms that intuitively and objectively would be a good candidate to receive the content intended to be shared by the user.

In a preferred embodiment, content may be shared using mobile electronic devices, such as smartphones, in fewer user input gestures than are required in native mobile operating systems, and as few as a single user input (e.g., a single input gesture from a user, such as in up to one touch). Such improved processes have the advantageous effect of changing the user's experience and engagement, as well as using artificial intelligence to achieve a fast, intuitive, and reduced-action process for the sharing of such content.

A method, application and/or device with the capacity to easily share media content between users with as few as a single input gesture from a user such as down to one touch, can create a revolution in the digital and electronic communications industry, since it will allow users to avoid the lengthy and at times burdensome process of sharing a photo as currently needed in traditional operating systems. Such a method and device will dramatically improve the user experience, which will contribute to create positive experiences that will keep the user loyal to the features of the mobile electronic device and related application, and attract further users and will create a new kind of communication based on images.

In accordance with the following disclosure, it is noted that the present application describes a method, software, e.g., an "application," and/or a device that can integrate the functionalities of media capture and/or immediate media content sharing, such as an image, using mobile electronic devices, such as smartphones, in an intuitive way, improving the user's experience and requiring fewer user input gestures than existing techniques, and in some cases as few as a single input gesture from a user, such as down to one touch. In certain embodiments, the sharing may be made with up to two gestures or input actions (e.g., such as up to two taps). Accordingly, the techniques described herein have a potential to change the way that people communicate, thereby dramatically increasing user engagement in media content sharing.

In a first embodiment of the invention, a method performed by an electronic device having a touch sensitive display, such as a smartphone, is provided, whereby as an example, a user selects the type of content that is intended to be shared, like an image of his surroundings, and a Capture System is used to capture the content, such as through a camera functionality or a screenshot functionality, and such content is then captured with a user gesture action (202). The user performs such gesture action (202), like pressing the shutter of the app, which provides input to the application to capture such content.

Such content is then processed by an Artificial Intelligence System that analyses the content and identifies, based on the user's prior communications and patterns, the type of photo, geolocation, among others, the most suitable recipients, communication channels, and/or platforms that the user intends to share such content. The Artificial Intelligence System processes and analyzes the content to be shared based on the user's interaction with other users and/or applications, sharing patterns, the frequency of communications and/or interactions with other users and/or platforms, the information of the media content (texts, elements, people, colors, textures, type, etc.), the geolocation of the content, among others. The Artificial Intelligence System may also use text recognition features to process text within an image and/or video.

Figure 4:
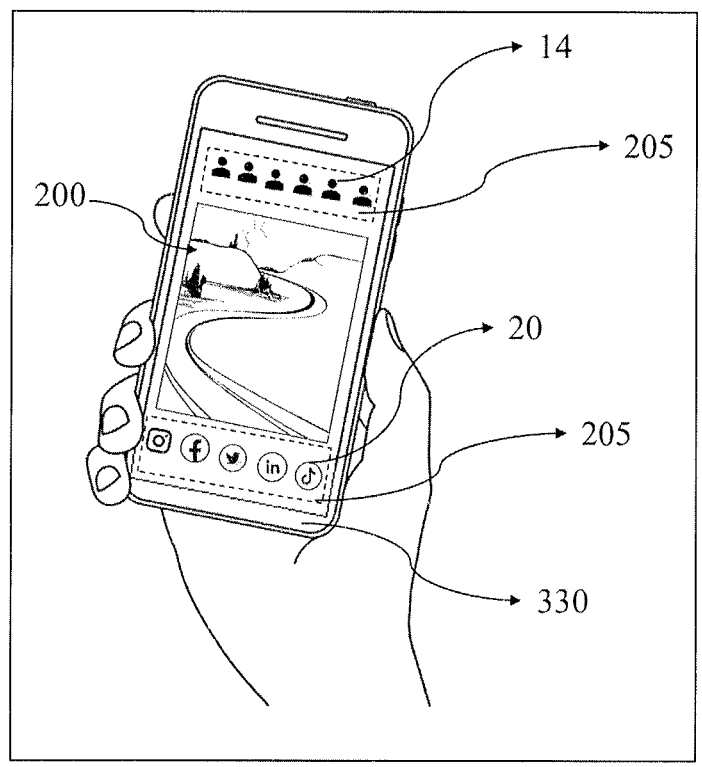
FIG. 4 shows an embodiment of a sharing screen (330), comprising the shareable media content (200), a plurality of selectable regions (205), a plurality of recipients (10) with whom the media content can be shared, and a plurality of social media platforms (20) that can also be used to share such content (200).

As a result (output) of the Artificial Intelligence System's processing of the content based on the above parameters, an innovative Sharing Screen (330) is presented in the display, as seen in FIG. 4. The Sharing Screen (330) presents, in a simple interface, the selected recipients, communication channels, and/or platforms within the same screen as the shareable content. The Sharing Screen (330) shows at least one selectable region (205) that shows a selection of recipients and corresponding communication channels and/or that shows social media platforms (or other platforms) based on the Artificial Intelligence System's analysis. The user then performs a user gesture action (202), such as a tap, at one or more selected recipients and/or platforms, to which said content is transmitted.

In this first embodiment of the present disclosure, a method performed by an electronic device, the electronic device (100) comprising a display (101) incorporating a touch sensitive surface and at least one processor, the method comprising:

a) Capturing media content, such as an image, through the use of a Capture System, wherein the Capture System comprises at least one of a camera functionality (201) or a screenshot functionality, wherein such image is then captured with a user gesture action (202), like tapping on at least one shutter button, that provides input to the processor.

b) Processing the captured image through an Artificial Intelligence System that analyses the content of the image and identifies, based on the user's prior communications and patterns, the most suitable recipients, communication channels, and/or platforms that the user intends to share such content, wherein the Artificial Intelligence System processes and analyzes the content to be shared based on the user's interaction with other users and/or applications, sharing patterns, the frequency of communications and/or interactions with other users and/or platforms, the information of the media content (type of photo, texts, elements, people, colors, textures, etc.), the geolocation of the content, among others.

c) In response to the Artificial Intelligence System processing, presenting an innovative sharing screen (330) giving preference based to the AI patterns on the display with a simple interface that comprises a plurality of selectable regions (205), each of the selectable regions being associated with a different communication channel and audience from among a plurality of channel-audience combinations, the plurality of channel-audience combinations including at least one of
  i. a recipient (10) and an associated communication channel selected from among text, email, or mobile application communication channels, or,
  ii. a social media platform (20) of the user of the electronic device;
d) Receiving an input from at least one second gesture action (202), such as a tap, on a selected region (205) within the sharing screen (330); and
e) Upon receipt of the second gesture(s) action(s), creating and transmitting a message in accordance with a selected channel-audience combination from among the plurality of channel-audience combinations corresponding to the selected region, wherein the message includes the shareable content (200).

The method of the invention integrates the functionalities of fast media content sharing using mobile electronic devices, such as smartphones, in fewer input operations by a user as compared to existing operating system sharing processes, given the use of a smart interface and an Artificial Intelligence System that processes the content to be shared. In an innovative manner, the user is presented with a simple and intuitive screen to be able to share media content (such as an image or a screenshot, amongst others) in a fast manner.

The method of the invention may be integrated throughout the electronic device (100) user interface and/or a third-party application installed within the device (not a native application). In 310 particular, the method of the invention may be implemented with a mobile application or utility installable on a mobile device, i.e., a third-party application. The method of the invention may also, or alternatively, be implemented by the mobile device native user interface.

The electronic device (100) according to the present disclosure may be any electronic device that enables an electronic communication between different devices, but is selected preferably from a mobile phone, such as a smartphone, tablet, laptop or a personal computer (PC). More preferably, the electronic device is a smartphone.

Figure 2:
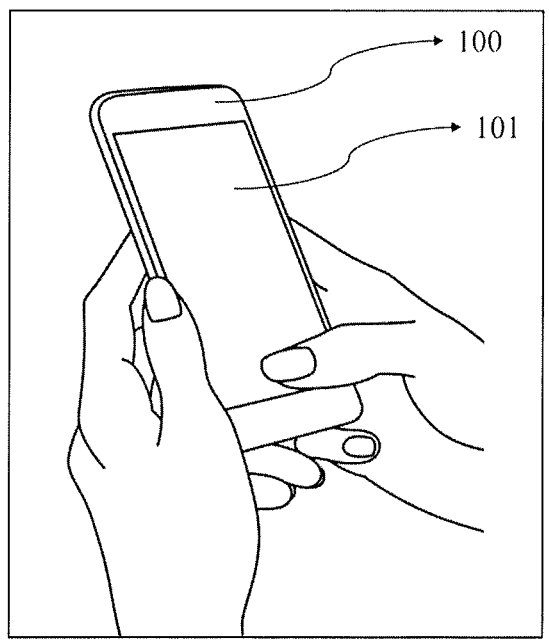
FIG. 2 shows an embodiment of the invention including an electronic device (100), such as a smartphone, having a display (101) with a touch sensitive screen.

In a preferred embodiment, the electronic device (100) comprises a display (101) that incorporates a touch-sensitive surface and at least one processor, as seen in FIG. 2. The touch-sensitive surface corresponds to the surface within the display that is able to detect a user gesture action (202) as input information and provide an output to the processor in order to perform a specific action. The processor is a component within the hardware of the electronic device that controls the different processes, receives and executes commands, and handles the different instructions from the inputs received in the electronic device.

The method from the present invention provides for capturing media content, where the user choses the type of media content that intends to share. Such media content (200) includes but is not limited to, images, such as photos, videos, and screenshots, among others. As described herein, the media content may also be referred to as shareable content (200).

Figure 3:
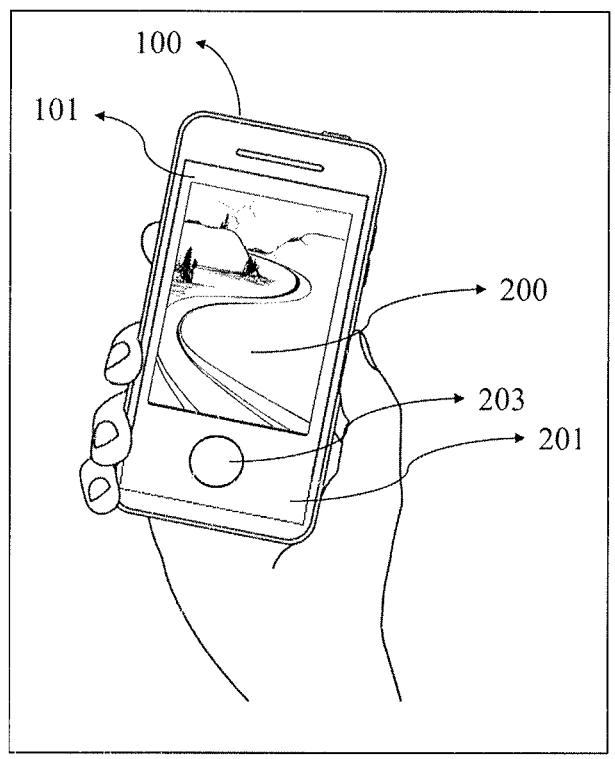
FIG. 3 shows a preferred embodiment of a display of the camera functionality (201), including an electronic device (100), such as a smartphone, having a display (101) with a touch sensitive screen, at least one capture button (203), and the content that is intended to be captured to be shared (200).

The media content is captured through the use of a Capture System, wherein the Capture System comprises at least one of a camera functionality or a screenshot functionality, where:
  A camera functionality (201) refers to a functionality of the method of the present disclosure that comprises a camera feature that is configured to capture media content through camera hardware included in the electronic device. The camera functionality (201) comprises a camera application and/or integration with the current application that allows to access and use the camera hardware in the electronic device for the capture of media content. The camera functionality makes use of the camera hardware in order to show the content that can be captured and includes at least one capture button (203) like a shutter, which allows to capture such content as intended by the user, as seen in FIG. 3. The camera functionality may be integrated within the same application of the present disclosure or can be a different camera app (other than the default camera app).
  A screenshot functionality refers to a functionality of the method of the present invention that allows to capture a screenshot of the display that is viewed on the electronic device. The screenshot functionality allows to capture a screenshot through an input including at least one user gesture action (202) and/or another action predefined by the user and/or application.

As used herein, the user gesture action (202) includes one or more actions performed by the user, which can be selected from the group comprising at least one of a touch, a click, a tap, a swipe, a flicking, a flinging, or a grabbing (e.g., a "pinch") of a portion of an interface provided for display on a display screen, among others, as well as combinations thereof. A gesture action (202) can also include one or more motions, including at least one of a touch, a click, a tap, a swipe, a flicking, a flinging, a movement of the electronic device, or a grabbing (e.g., a "pinch") of a portion of an interface received at the display in response to contact from one or more user's fingers.

As used herein, a gesture action (202) may also be a motion or pressure made by the user's hand or fingers that is detected by the electronic device, for example by contact with the touch sensitive surface or with the hardware, such as physical button. A gesture action (202) therefore may be a physical movement performed by the user and include one or more characteristics such as direction, pressure, duration, etc., relative to contact to the touch sensitive surface. In an example, a gesture action includes a single tap, a single touch, one or more consecutive taps in the same or different regions, a simultaneous tap or touch in the same or different regions, simultaneous rapid tap or touch in the same or different regions a repeated tap or touch in the same or different regions, and combinations thereof. In an embodiment, multiple gesture actions (202) may be performed by a user.

The captured shareable content (200) is then processed through an Artificial Intelligence System, which analyses the content of the image and identifies, based on the user's prior communications and patterns, type of photo, geolocation, the most suitable recipients, communication channels, and/or platforms that the user intends to share such content.

The Artificial Intelligence System processes and analyzes the content to be shared based on the user's interaction with other users and/or applications, sharing patterns, the frequency of communications and/or interactions with other users and/or platforms, the information of the media content (texts, elements, people, colors, textures, type of image, etc.), the geolocation of the content, among others. In a preferred embodiment, the method comprises using the Artificial Intelligence System to predetermine and customize which recipients (10) (along with their suggested communication channel), and/or which platforms (20) (such as social media platforms) appear on the sharing screen (204).

The method comprises obtaining a contact's phone number, a contact's social media profile, a contact's e-mail from each of a plurality of applications installed in the electronic device (100), the plurality of applications including one or more of a contacts application, a messaging application and a social media application, and sharing that information with the Artificial Intelligence System for its processing.

In more detail, the method of the present application uses an Artificial Intelligence System that is programmed to learn from user's past input actions, messaging patterns and content, and that is able to analyze the image that is being shared by the user in order to suggest to the user who the recipient is based on the user's past interactions with such user and the information analyzed from the image. For example, a user usually sends photos of birds to one of its contacts that is a bird watcher, if such user takes a photo of a bird, the artificial intelligence system should analyze the photo, determine it's a bird, and suggest such contact as a recipient for such photo. For this, the artificial intelligence platform should have learned, from the user's past interactions and analysis of the photos shared from such user and with the different recipients, in order to suggest the most suitable contact for sharing.

It is important to mention that when the method starts being used through the mobile device, the Artificial Intelligence System may not have information to learn from past user's experience, and therefore the user may manually set up favorite contacts to share the shareable content, as well as manually set up other processes or features within the software.

In an embodiment, the method comprises receiving a customization input from a user to select, predetermine or customize which recipients (10), along with their corresponding suggested communications channel, and which social media platform (20) appear on the sharing screen (330).

In an embodiment, the user gesture action includes a hold gesture that is continuous between the media content capture and the recipient selection at the sharing screen, thereby sending the shareable content in response to a single, continuous gesture operation. In this embodiment, the sharing is made with up to one single, continuous or semi-continuous gesture action, such as the movement of a user's finger. In another embodiment, the user gesture actions (202) are separate, discrete input events in each screen presented to the user.

The method comprises presenting an innovative sharing screen (330) in response to the Artificial Intelligence System processing. The sharing screen (330) is a dynamic screen that reorders and presents recipients (10) along with suggested associated communication channel and/or platforms (20) such as social media platforms based on the Artificial Intelligence System processing. The sharing screen comprises a plurality of selectable regions (205) that correspond to a communication channel and audience combination, wherein the channel-audience combinations include at least one of:

a recipient (10) along with its suggested associated communication channel, selected from among text, email, or mobile application communication channels, or
 a platform (20) of the user of the electronic device, such as a social media platform.

In an embodiment, the sharing screen (330) is a dynamic screen that automatically re-orders the recipients (10) and social media profiles (20) based on artificial intelligence, as previously described.

In an embodiment, the sharing screen (330) includes a scrolling feature or refreshing feature to increase the visibility of recipients (10) and/or platforms (20).

In an embodiment, the shareable content (200) is transmitted to a recipient (10) through at least one, two, three or more different communication channels. Communication channels include, but are not limited to:
 i. Telephonic-based communication channels, including text messages;
 ii. Internet-based communication channels, including e-mail platforms;
 iii. Proprietary applications, such as an application that integrates the method of the invention, which allows users to share content directly through the said proprietary application;
 iv. Third-party or native applications having a messaging feature, including WhatsApp, Viber, IMessage, Twitter, Instagram, etc.

In an embodiment, each communication channel includes contact information from at least one contact or recipient and may include, but is not limited to a user's phone number, a user's social media user-name (such as Instagram, Facebook, Twitter), a user's messaging platform information (such as WhatsApp, IMessage, Viber, etc), a user's e-mail address and a user's physical address, among others.

In an embodiment, the user can easily add additional elements to the content to be shared before sharing, such as a caption, a voice over, music, sound, drawings, amongst other elements.

As it can be seen, the sharing according to the method of the invention can be made in a limited set of movements, such as in up to one gesture action (including a touch, hold, swipe, and release gesture) or in up to two overall gesture actions, including two tap operations.

As it can be seen, the method of the present application can shorten the time needed to post the last photo taken by a user through a messaging application in up to three times. The method of the present invention allows removing several steps that are required by conventional applications and operating systems by facilitating the sharing and/or uploading of shareable media content in up to one single movement from a user's finger.

The method of the invention also allows users to continue to browse and operate their mobile devices given that the sharing process is made in a non-intrusive way since there is no need for the user to tap into additional applications and screens.

Example I

As an exemplary embodiment of the invention, a method according to the present invention is implemented by a mobile device, such as a smartphone, wherein a user wishes to capture an image with the smartphone camera and share such image with a contact.

The user accesses the application of the present disclosure which has a camera functionality (201) and aligns the content the user wishes to capture (image to capture) and then performs a user gesture action (202) through a tap on the capture button that allows to capture such content and save it into the electronic device. Such gesture action provides input to the application, wherein such image is shared with the Artificial Intelligence System which analyzes and processes such image based on the user's interaction with other users and/or applications, sharing patterns, the frequency of communications and/or interactions with other users and/or platforms, the information of the media content (texts, elements, people, colors, textures, etc), and the geolocation of the content.

Then, in response to the processing of the Artificial Intelligence System, the smartphone displays the innovative sharing screen (330), which presents the user with a selection of regions including predetermined contacts to which the user may transmit said image.

The user then selects the contact to which the image should be sent and performs a gesture action, such as a tap over the selected contact, after which the image is sent to the selected contact.

As described herein, a gesture action (202) may include one or more actions, including at least one of a touch, a click, a tap, a swipe, a flicking, a flinging, a motion, or a grabbing (e.g., a "pinch") of a portion of the touch screen for example. It is understood that different types of gestures can be used to achieve the above purpose.

Example II

As an exemplary embodiment of the invention, a method according to the present invention is implemented by a smartphone (100) having a touch sensitive screen in its display (101), wherein a user wishes to share a family photo with relatives.

The user then captures an image of a family gathering through a camera functionality (201). The user accesses the application of the present disclosure and aligns the family gathering photo the user wishes to capture and then performs a user gesture action (202) through a tap on at least one shutter (203) that allows to capture such photo of the family gathering and save it into the smartphone (100). Such tap (202) on the shutter (203) provides input to the application, wherein such photo is then shared with the Artificial Intelligence System. The Artificial Intelligence System analyzes and processes such image based on the user's interaction with other users and/or applications, sharing patterns, the frequency of communications and/or interactions with other users and/or platforms, the type of photo, the information of the media content (texts, elements, people, colors, textures, etc.), and the geolocation of the content.

Then, in response to the processing of the Artificial Intelligence System, the smartphone displays an innovative sharing screen (330), which presents the user with a selection of regions including predetermined contacts to which the user may transmit said image.

Given that the user took a photo of a family gathering, the Artificial Intelligence System recognizes such photo type (through facial recognition, among others), and suggests as a first option the family members that these types of photos are usually sent through, and their preferred communication channel. For example, the sharing screen shows, initially, the contacts of Mom, Dad, Grandpa, and Uncle Steve, all usually contacted through Whatsapp, and the user can easily select at least one of such contacts to send the photo.

The user then selects the contact to which the image should be sent and performs a gesture action, such as a tap over the selected contact, after which the image is sent to the selected contact.

Example III

As an exemplary embodiment of the invention, a method according to the present invention is implemented by a smartphone (100) having a touch sensitive screen in its display (101), wherein a user wishes to take a photo of himself travelling to post on social media.

The user then captures a selfie photo through a camera functionality (201), by accessing the application of the present disclosure and aligning his face and background and then performs a user gesture action (202) through a tap on at least one shutter (203) that allows to capture such selfie photo and save it into the smartphone (100). Such tap (202) on the shutter (203) provides input to the application, wherein such photo is then shared with the Artificial Intelligence System. The Artificial Intelligence System analyzes and processes such image based on the user's interaction with other users and/or applications, sharing patterns, the frequency of communications and/or interactions with other users and/or platforms, the type of photo, the information of the media content (texts, elements, people, colors, textures, etc.), and the geolocation of the content.

Then, in response to the processing of the Artificial Intelligence System, the smartphone displays an innovative sharing screen (330), which presents the user with a selection of regions including predetermined contacts to which the user may transmit said image.

Given that the user took a selfie, the Artificial Intelligence System recognizes that these types of photos are mostly used by the user for sharing through social media platforms, and also analyzes its geolocation and other parameters to suggest which platform to suggest in the sharing screen (330). Then, the Artificial Intelligence System suggests a combination of platforms (20) such as Instagram and TikTok, which are the ones mostly used by the user in this context. The Artificial Intelligence System also may suggest these platforms given the geolocation of the photo, where it is detected that the user is potentially travelling or far from its habitual places.

The user then selects the contact to which the image should be sent and performs a gesture action, such as a tap over the selected platform (20), after which the image is posted to the platform.

Example IV

As an exemplary embodiment of the invention, a method according to the present invention is implemented by a smartphone (100) having a touch sensitive screen in its display (101), wherein a user wishes to share a photo of a document with its coworkers.

The user then captures an image of the document through a camera functionality (201). The user accesses the application of the present disclosure and aligns the document view the user wishes to capture and then performs a user gesture action (202) through a tap on at least one shutter (203) that allows to capture such photo of the document and save it into the smartphone (100). Such tap (202) on the shutter (203) provides input to the application, wherein such photo is then shared with the Artificial Intelligence System. The Artificial Intelligence System analyzes and processes such image based on the user's interaction with other users and/or applications, sharing patterns, the frequency of communications and/or interactions with other users and/or platforms, the type of photo, the information of the media content (texts, elements, people, colors, textures, etc.), and the geolocation of the content.

Then, in response to the processing of the Artificial Intelligence System, the smartphone displays an innovative sharing screen (330), which presents the user with a selection of regions including predetermined contacts to which the user may transmit said image.

Given that the user took a photo of a document, the Artificial Intelligence System recognizes such photo type (through text recognition, among others), and suggests as a first option the coworkers that these types of photos are usually sent to, and their preferred communication channel. For example, the sharing screen shows, initially, the contacts of the user's Boss, Coworker1, and Coworker2, all usually contacted through Whatsapp, and the user can easily select at least one of such contacts to send the document photo.

The user then selects the contact to which the image should be sent and performs a gesture action, such as a tap over the selected contact, after which the image is sent to the selected contact.

It is to be understood that both the foregoing general description and the following detailed description are exemplary and explanatory only and are not restrictive of the present disclosure.

The well-known inventor of the present method and application has been recognized worldwide as entrepreneur of the year, innovator of the year, and businessman of the year, having received numerous awards from all over the world, including the World Intellectual Property Organization (WIPO) Medal for Inventors. Furthermore, the inventor has developed an Intellectual Property portfolio valued in more than 3 billion USD, including more than 2,000 patents in more than 190 countries worldwide.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for fast sharing of images between mobile electronic devices using an innovative platform, the method by an electronic device, the electronic device (100) comprising a display (101) incorporating a touch sensitive surface and at least one processor, the method comprising:
   a) capturing a shareable content, including captured images, through the use of a Capture System, wherein the Capture System comprises at least one of a camera functionality (201) or a screenshot functionality, wherein the shareable content is captured with a user gesture action (202), which comprises tapping on at least one shutter button, and thereby providing input to the processor,
   b) processing the captured image and identifying through an analysis performed by a machine learning algorithm, based on prior communications and sharing patterns, by the user, the recipients, communication channels, and platforms which the user has previously shared similar shareable content, wherein:
      i) the analysis processes and analyzes the captured image based on the user's previous interaction with other users and applications, previous sharing patterns, the frequency of communications and/or interactions with other users and/or platforms, the information of the captured image including at least one of a type of photo, texts, particular people in a photo, colors, textures, and the geolocation of the content, and
      ii) the analysis compares the captured image to the user's past input actions, searches, interests, interactions with the web and other applications, messaging patterns, and a combination thereof;
   c) in response to the analysis, presenting a sharing screen (330) on the display with an interface that comprises a plurality of selectable regions (205) giving preference to the most statistically correlated recipients and communication channels from step b), each of the selectable regions displaying a different communication channel and audience from among a plurality of displayed channel-audience combinations;
   d) receiving an input from at least one second gesture action (202) which comprises tapping on a selected region (205) within the sharing screen (330); and
   e) upon receipt of the second gesture(s) action(s), creating and transmitting a message in accordance with a selected channel-audience combination from among the plurality of displayed channel-audience combinations corresponding to the selected region, wherein the message includes the shareable content (200).

2. The method of claim 1, wherein the electronic device (400) is a mobile phone having a touch sensitive surface.

3. The method of claim 1, wherein the touch-sensitive surface corresponds to the surface within the display that is able to detect a user gesture action (202) as input information and provide an output to the processor in order to perform a specific action.

4. The method of claim 1, wherein the media content (200) is selected from the group comprising photos, videos, and screenshots, and text.

5. The method of claim 1, wherein the gesture action (200) includes one or more actions and/or motions performed by the user, which can be selected from the group comprising at least one of a touch, a click, a tap, a swipe, a flicking, a flinging, or a grabbing of a portion of an interface provided for display on a display screen, and combinations thereof.

6. The method of claim 1, wherein the gesture action (202) includes a motion or pressure made by the user's hand or fingers that is detected by the electronic device.

7. The method of claim 1, wherein the analysis is configured to perform analysis of the shareable content to detect and analyze any text, symbols, logos, colors, textures, type of photo, based on its georeferenced location (geolocation), based on the time of capture of media content, and combinations thereof.

8. The method of claim 1, wherein the camera functionality (201) comprises a camera application and/or integration with the current application that allows to access and use the camera hardware in the electronic device for the capture of media content.

9. The method of claim 1, wherein the camera functionality (201) makes use of the camera hardware in order to show the content that can be captured and includes at least one capture button (203) that allows to capture such content as intended by the user.

10. The method of claim 1, wherein the camera functionality (201) is integrated within the application or is a different camera application (other than a default camera application).

11. The method of claim 1, wherein the screenshot functionality allows capture of a screenshot of the display that is viewed on the electronic device.

12. The method of claim 1, wherein the screenshot functionality allows capture of a screenshot through an input including at least one user gesture action (202) and/or another action predefined by the user and/or application.

13. The method of claim 1, wherein the analysis further reviews information such as a contact's phone number, a contact's social media profile, a contact's e-mail from each of a plurality of applications installed in the electronic device (100), the plurality of applications including one or more of a contacts application, a messaging application and a social media application.

14. The method of claim 1, wherein the method comprises receiving a customization input from a user to select, pre-determine or customize which recipients (10), along with their corresponding suggested communications channel, and which social media platform (20) appear on the sharing screen (330).

15. The method of claim 1, wherein the user gesture action (202) includes a hold gesture that is continuous between the shareable content capture and the recipient selection at the sharing screen, thereby sending the shareable content in response to a single, continuous gesture operation.

16. The method of claim 1, wherein the user gesture actions (202) are separate, discrete input events in each screen presented to the user.

17. The method of claim 1, wherein the sharing screen (330) includes a scrolling feature or refreshing feature to increase the visibility of recipients (10) and/or platforms (20).

18. The method of claim 1, wherein the shareable content (200) is transmitted to a recipient (10) through communication channels selected from the group comprising Telephonic-based communication channels; Internet-based communication channels; Proprietary applications which allow users to share content directly through the proprietary application; Third-party or native applications having a messaging feature and Instagram.

19. The method of claim 1, wherein each communication channel includes contact information from at least one contact or recipient but the information is selected from the group that includes a user's phone number, a user's social media user name, a user's messaging platform information, a user's e-mail address and a user's physical address.

20. The method of claim 1, wherein the user can easily add additional elements to the shareable content before sharing, wherein the additional elements are selected from the group comprising a caption, a voice over, music, sound, and drawings.

21. The method of claim 1, wherein the analysis may also use text recognition features to process text within an image and/or video.

22. The method of claim 1, further comprising, in response to the analysis, displaying in the sharing screen, a combination of selectable social media platforms selected from among a plurality of social media platforms based on the geolocation of the content.

* * * * *